(12) United States Patent
Nanni et al.

(10) Patent No.: US 6,389,269 B1
(45) Date of Patent: May 14, 2002

(54) METHOD AND APPARATUS FOR MULTIPLE BAND TRANSMISSION

(75) Inventors: Peter Nanni, Algonquin; Li Xiang, Buffalo Grove; Eric Midlock, Chicago, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/594,395

(22) Filed: Jun. 15, 2000

(51) Int. Cl.$^7$ ................................. H04B 1/02
(52) U.S. Cl. ................ 455/93; 455/127; 455/552; 455/126
(58) Field of Search ................ 455/127, 126, 455/103, 552, 553, 93, 89, 39, 114; 333/124, 125, 126, 127, 32

(56) References Cited

U.S. PATENT DOCUMENTS

| | | | |
|---|---|---|---|
| 4,037,177 A | * 7/1977 | Tyrey | 333/32 |
| 5,020,092 A | 5/1991 | Phillips et al. | 379/59 |
| 5,060,294 A | 10/1991 | Schwent et al. | 455/93 |
| 5,251,331 A | 10/1993 | Schwent et al. | 455/127 |
| 5,438,684 A | 8/1995 | Schwent et al. | 455/89 |
| 6,023,611 A | * 2/2000 | Bolin | 455/114 |
| 6,091,966 A | * 7/2000 | Meadows | 455/553 |
| 6,188,877 B1 | * 2/2001 | Boesch | 455/74 |

* cited by examiner

Primary Examiner—Vivian Chang
Assistant Examiner—John J Lee
(74) Attorney, Agent, or Firm—Daniel R. Collopy; Roland K. Bowler, II

(57) ABSTRACT

A method and apparatus for transmitting in multiple radio frequency (RF) bands from a single device is described. The device includes a transmitter (128) for transmitting RF communication signals. The transmitter is comprised of a power amplifier (200) for amplifying the RF communication signal in either a first RF band or a second RF band. The transmitter has a complex transformer (202) for partially transforming the impedance of the RF communication signal in a first RF band, and completely transforming the impedance of the RF communication signal to the characteristic impedance in a second RF band. The transmitter also includes a first path (204) for transmitting the RF communication signal in the first RF band and a second path (206) for transmitting the RF communication signal in the second RF band. The first path completes the impedance transformation of the RF communication signal when the system is operating in the first RF band and the second path operates at the characteristic impedance when the system is operating in the second RF band.

13 Claims, 5 Drawing Sheets

METHOD AND APPARATUS FOR MULTIPLE BAND TRANSMISSION

BACKGROUND OF THE INVENTION

The present invention relates to the transmission of radio frequency (RF) communication signals. More particularly the invention relates to a method and apparatus for transmitting RF communication signals in multiple frequency bands.

Multiple communications standards have driven the need for wireless communication devices such as cellular and personal communication service (PCS) radiotelephones to be compatible with multiple standards. Having multimode capability allows one device to operate with more than one system or standard and, depending on the standards available, the user can potentially use the device on more than one continent or more than one country. A multi mode communication device is designed to transmit and receive RF communication signals of either an analog or a digital nature or a combination thereof depending on the communication systems in operation in the users geographical location. The standard for transmitting analog RF communication signals typically the advanced mobile phone system (AMPS) and the transmission standard for digital RF signals may be chosen from a plurality of multiple access techniques including time division multiple access (TDMA), code division multiple access (CDMA), and global system for mobile communications (GSM). A multimode device incorporates electronics necessary to operate within a plurality of these standards, for example a dual mode device has the capability to operate in two systems, following two different standards. This allows the user to move from one system to another and the device will operate as long as the multimode communication device incorporates one of the standards for the system in operation. The transmission portion of a multimode communication device is similar to those devices which are single mode, or designed to transmit within one frequency band, but are adapted to transmit at multiple frequency bands in accordance with any of the standard protocols mentioned above, analog or digital.

Typical single band RF transmitter circuitry comprises a power amplifier (PA), a and pass filter, impedance matching circuitry, and an antenna. The PA amplifies the communication signal in accordance with the desired communication protocol. Impedance matching circuitry minimizes the RF loss as the signal passes form the PA to the antenna. The filter allows the RF communication signal of the desired frequency band to pass through to the antenna and to transmission in to the air interface. The band pass filter and impedance matching circuitry are generally designed specifically to operate in a given frequency band. In order to transmit in multiple adjacent or separated bands, additional components are required to allow frequency band adjustments.

One method for achieving multiband transmission capability is to employ two or more individual PA devices into the wireless communication device. This requires one PA for each mode or frequency band that the device is designed to operate in. This further requires providing a corresponding number of electrical paths, one for each individual PA and related circuitry for filtering and impedance matching. In this scenario, a first PA and related circuitry would be optimized to operate in a first frequency band in accordance with any of the analog or digital standards. A second PA and related circuitry would be optimized to operate in a second frequency band in accordance with the desired standard. This approach requires minimal design effort however, having multiple PA's adds significant cost to the product as PA's are one of the more expensive components due to their complexity. In addition, the cost and complexity are exacerbated with PA's used for digital RF transmission.

A second method for achieving multiband transmission capability is to utilize a pin diode circuit. With the pin diode circuit a single PA is followed by a pin diode switching network embedded into the input and output impedance matching network. The pin diode switching network controls the post amplifier impedance matching of the communication signal in response to electrical command signals sent by the microprocessor. Changing the impedance characteristics of the pin diode switching network changes the frequency response of the circuit in accordance with the operation mode of the device. For example, when the communication device is in a first operation mode, the pin diode switching network is switched to the first RF band corresponding thereto. This method however requires an extensive number of parts increasing both cost and complexity of circuit, and rendering optimization and tuning very difficult. Also because the pin diodes are nonlinear, these circuits tend to distort the desired communication signal and generate adjacent channel power (ACP) noise thereby interfering with users on neighboring channels. This makes their utilization in the linear modulation schemes (CDMA and TDMA) prohibitive.

A third method utilizes a diplexing circuit following a single PA which provides a first path and a second path, one path for each mode of the dual mode communication device. The first path is designed for a first RF band in accordance with a first mode and a second path, designed for a second RF band in accordance with a second mode. In this configuration the PA output is connected to a signal transmission line that diverges into the first path and the second path. Each transmission line is connected to a band pass filter and related matching circuitry corresponding to the desired band.

In order for the diplexing method to work, the circuit must include long signal transmission lines to carry the amplified signal between the PA and the components of and the respective filtering. A first consequence is that, space on the printed circuit board (PCB) must be available to accommodate the necessarily long transmission lines as both the line length and width are critical to the circuit performance. Second, the necessary length of the transmission line makes the circuit extremely lossy requiring more power and making the overall circuit less efficient.

A variation of the diplexing method removes the issue of long, lossy transmission lines, but another disadvantage prevails. This circuit requires high precision discrete components to achieve the high Q value necessary for proper circuit performance in place of the lengthy transmission line. This does allow for reduced space necessary on the PCB for the transmission line but the number of high precision parts increases significantly adding to the cost of the device.

A final disadvantage to the diplexing method is the critical out of band impedance of the post PA filters. In order for the diplexing to work properly, the out of band impedance of the first band filter must be accurately known when the circuit is operating at the second frequency band and conversely the out of band impedance of the second frequency band filter must be accurately known when the circuit is operating at the first frequency band. This is necessary to ensure that the transmission lines are the proper length and that the PA sees an open circuit at the second RF band while looking into the first RF band path. Specifying that the out of band impedance be precise, adds cost and complexity to the filter and overall network design.

The use of additional circuitry poses a problem as this requires more space within the device and cost reduction is almost always desired. The current methods are inefficient creating unwanted power drain and reducing overall circuit performance. Therefore, there is a need to improve the means and method of transmitting RF signals in multiple frequency bands using fewer components while maintaining or improving the current transmitter performance levels.

DESCRIPTION OF THE PREFERRED EMBODIMENT

The present invention provides a unique method and apparatus for transmitting a radio frequency (RF) communication signal in multiple frequency bands. This may be applicable in wireless communication devices that operate with multiple communication systems, such as cellular communication systems, personal communication systems (PCS), or satellite communication systems. In the preferred embodiment of the present invention a dual mode transceiver of a portable wireless radiotelephone, transmits RF communication signals in a first RF band attuned to what is typically referred to as the 800 MHz frequency band or cellular band, and a second RF band attuned to what is typically referred to as the 1900 MHz band, or PCS band. Further, the dual mode transceiver is designed to operate under the advanced mobile phone system (AMPS) in the cellular band, or under the time division multiple access (TDMA) protocol in both the cellular band and the PCS bands. However, the transceiver may be designed to operate under communication protocols other than AMPS and TDMA, such as the global system for mobile communications (GSM), code division multiple access (CDMA), cdma2000, W-CDMA and the like.

Figure 1:
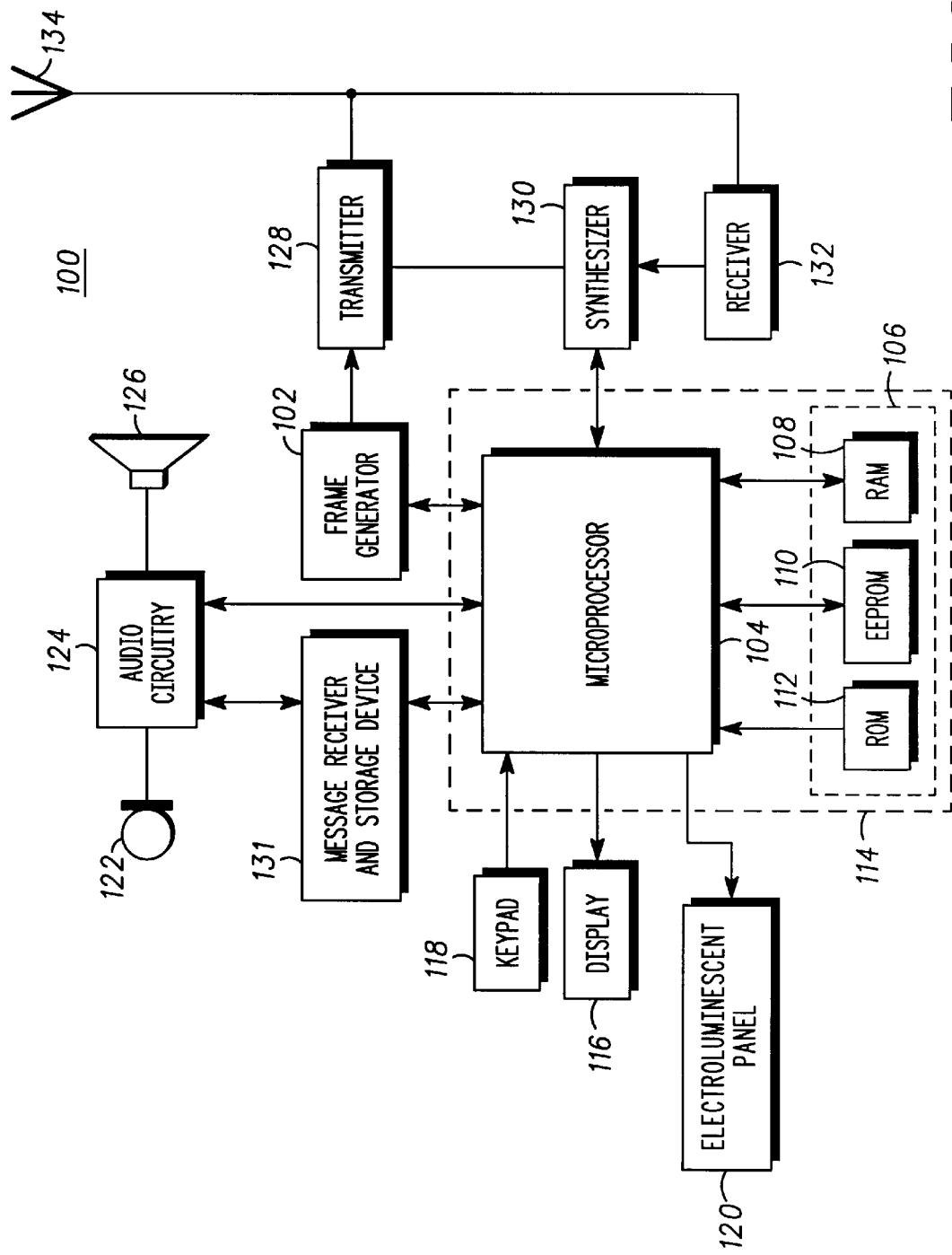
FIG. 1 shows a block diagram of a conventional dual mode radio frequency transceiver.

The block diagram in FIG. 1 shows a wireless communication device 100 in accordance with the preferred embodiment of the present invention. This device is a cellular radiotelephone incorporating the present invention.

In the preferred embodiment a frame generator ASIC 102, such as a CMOS ASIC available from Motorola, Inc. and a microprocessor 104, such as a 68HC11 microprocessor also available from Motorola, Inc., combine to generate the necessary communication protocol for operating in a cellular system. Microprocessor 104 uses memory 106 comprising RAM 108, EEPROM 110, and ROM 112, preferably consolidated in one package 114, to execute the steps necessary to generate the protocol and to perform other functions for the wireless communication device, such as writing to a display 116, accepting information from a keypad 118, or controlling a frequency synthesizer 130. ASIC 102 processes audio transformed by audio circuitry 124 from a microphone 122 and to a speaker 126.

Figure 2:
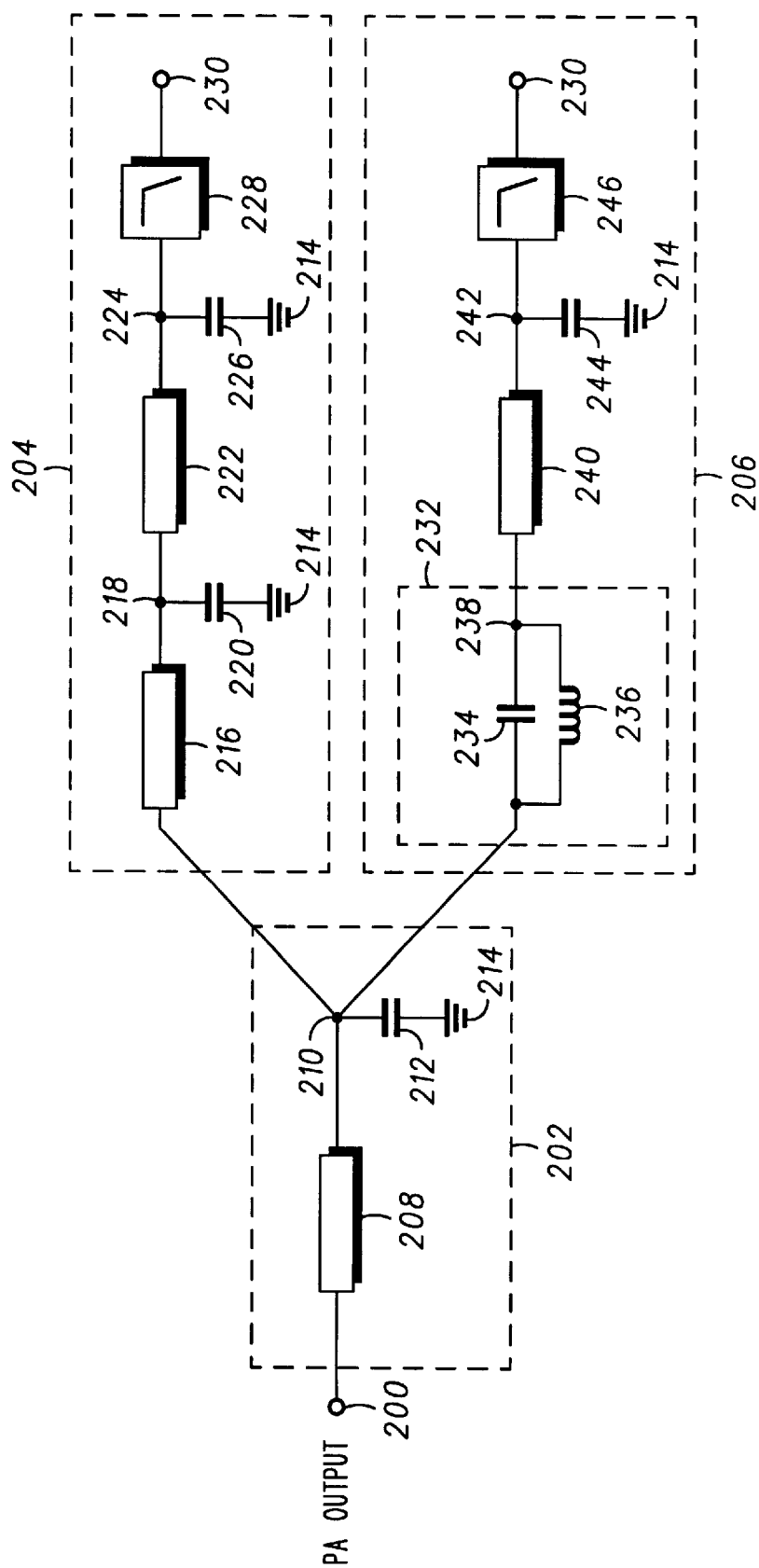
FIG. 2 shows a block diagram of the transmitter portion of the wireless communication device in accordance with the preferred embodiment of the present invention.
Figure 3:
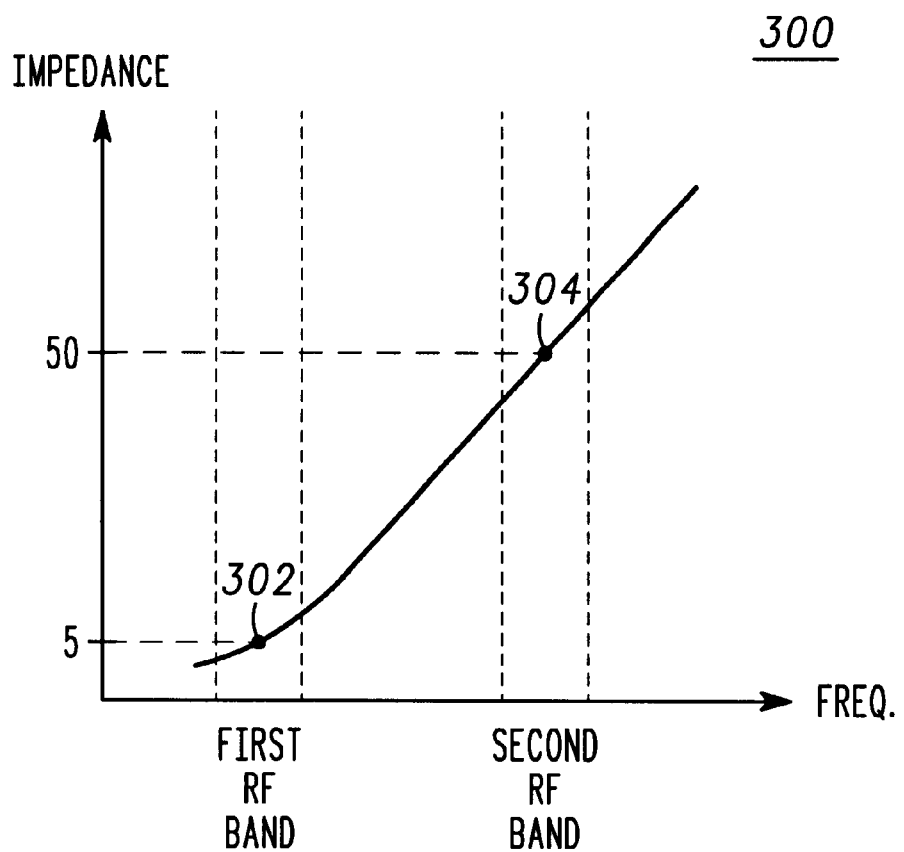
FIG. 3 shows the impedance transformation of the complex transformer as a function of frequency. This shows the transformation of the operative range of the transmitter in accordance with the preferred embodiment of the present invention.

FIG. 1 further shows the transmitter 128 which is capable of transmitting RF signals in two distinct RF bands which is required for operation of a dual mode communication device. FIG. 2 shows a detailed illustration of the transmitter 128 portion of the wireless communication device. The transmitter 128 is comprised of a power amplifier 200, a complex transformer 202, a first path 204 and a second path 206. The first path 204 is for transmitting in a first RF band and the second path 206 is for transmitting in a second RF band. In accordance with the preferred embodiment of the present invention, the first path 204 is attuned to transmit in accordance with the first operation mode and the second path 206 is attuned to transmit in accordance with the second operation mode. Even further, the first operation mode transmits AMPS RF communication signals, or in a low band, and the second operation mode is attuned to transmit PCS TDMA RF communication signals, or in a high band, The AMPS communication system operates from 824 MHz to 894 MHz, which is subdivided into 30 kHz channels. The TDMA communication system operates in the 824 MHz to 894, for the cellular system, and from 1850 MHz to 1990 MHz subdivided into 30 kHz channels for the PCS system. Depending on whether the communication device is in the first operation mode or the second operation mode, the RF communication signal will be The complex transformer 202 is further comprised of a first node 210, a second node 214, a first transmission line 208 coupled between the PA 200 and the first node 210, and a parallel capacitor 212 coupled between the first node 210 and the second node 214. In the preferred embodiment of the present invention the second node 214 is a common ground. The complex transformer 202 is designed to fully transform the system characteristic impedance to the desired load target at the second RF band. The complex transformer 202 partially transforms the impedance of the RF communication signal at the output of the PA 200 from a first impedance to a second impedance when the RF communication signal is in a first RF band. Turning to FIG. 3, a chart shows the change in impedance by the complex transformer 202 over a given frequency range. The complex transformer 202 completely transforms the RF communication signal from the first impedance to a third impedance when the RF communication signal is in a second RF band. For example in the case of the preferred embodiment of the present invention the first impedance at the PA 200 output is approximately two ohms and is partially transformed to approximately five ohms when the RF communication signal is in the first RF band and the first impedance is completely transformed from approximately two ohms to approximately fifty ohms when the RF communication signal is in the second RF band. Since the output impedance of the PA 200 is very low, a high quality (Q) first transmission line 208 is used followed by a high Q first capacitor 212 to ensure the circuit remains within the designed tolerances and operates properly.

The first path 204 is further comprised of: a third node 218, a fourth node 224, and a fifth node 230, a second transmission line 216 coupled between the first node 210 and the third node 218, a second parallel capacitor 220 coupled between the third node 218 and the second node 214, a third transmission line coupled between the third node 218 and the fourth node 224, a third parallel capacitor 226, coupled between the fourth node and the second node, and a first filter 228 coupled between the fourth node 224 and the fifth node 230.

Figures 4, 5:
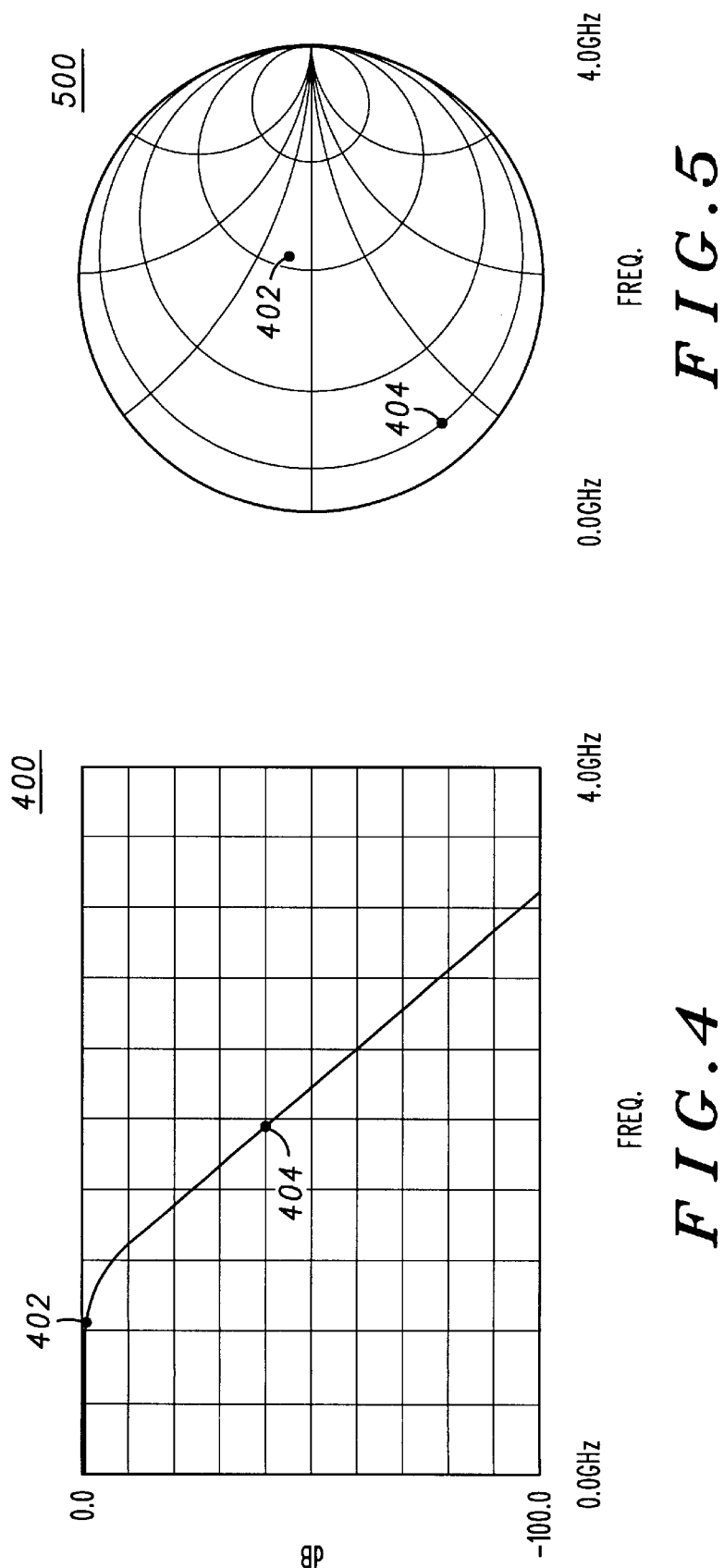
FIG. 4 shows the frequency response of the first path in accordance with the preferred embodiment of the present invention.
FIG. 5 is a smith chart corresponding to the frequency response chart in FIG. 4, showing the impedance of the out of band and the in band signals in accordance with the preferred embodiment of the present invention.

Turning to FIG. 4, a frequency response chart shows the frequency response of the first path 204. The frequency response is such that the RF communication signals in the first RF band pass through to the antenna. FIG. 4 also shows that the RF communication signal in the second RF band are attenuated significantly. FIG. 5 is a smith chart 500 showing the first RF band impedance 402 of the first RF band or in the band RF communication signal, and the second RF band impedance 404, of the second RF band or out of band communication signal.

The second path 206 is comprised of: a sixth node 238, a seventh node 242, a second filter 232 coupled between the first node 210 and the sixth node 238, a fourth transmission line 240 coupled between the sixth node 238 and the seventh node 242, a fourth parallel capacitor 244 coupled between the seventh node 242 and the second node 214, and a third filter 246 coupled between the seventh node 242 and the fifth node 230.

Figure 7:
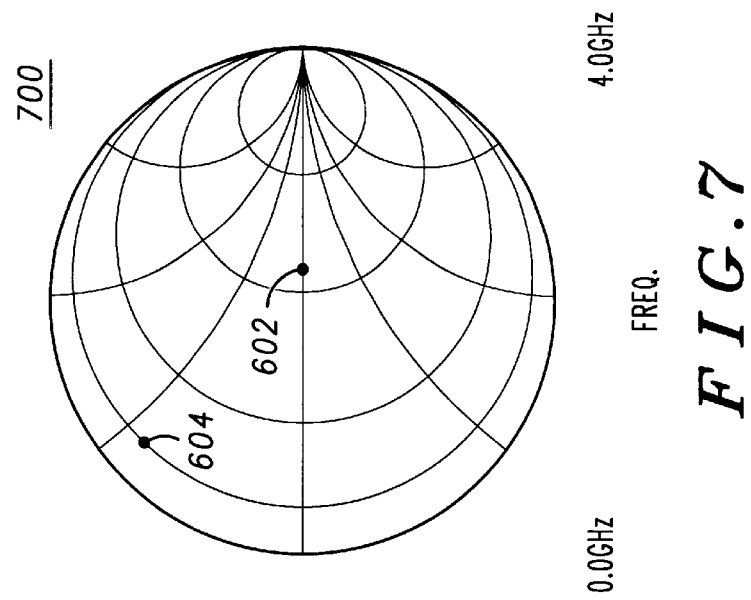
FIG. 7 is a smith chart corresponding to the frequency response chart in FIG. 6, showing the impedance of the out of band and the in band signals in accordance with the preferred embodiment of the present invention.
Figure 6:
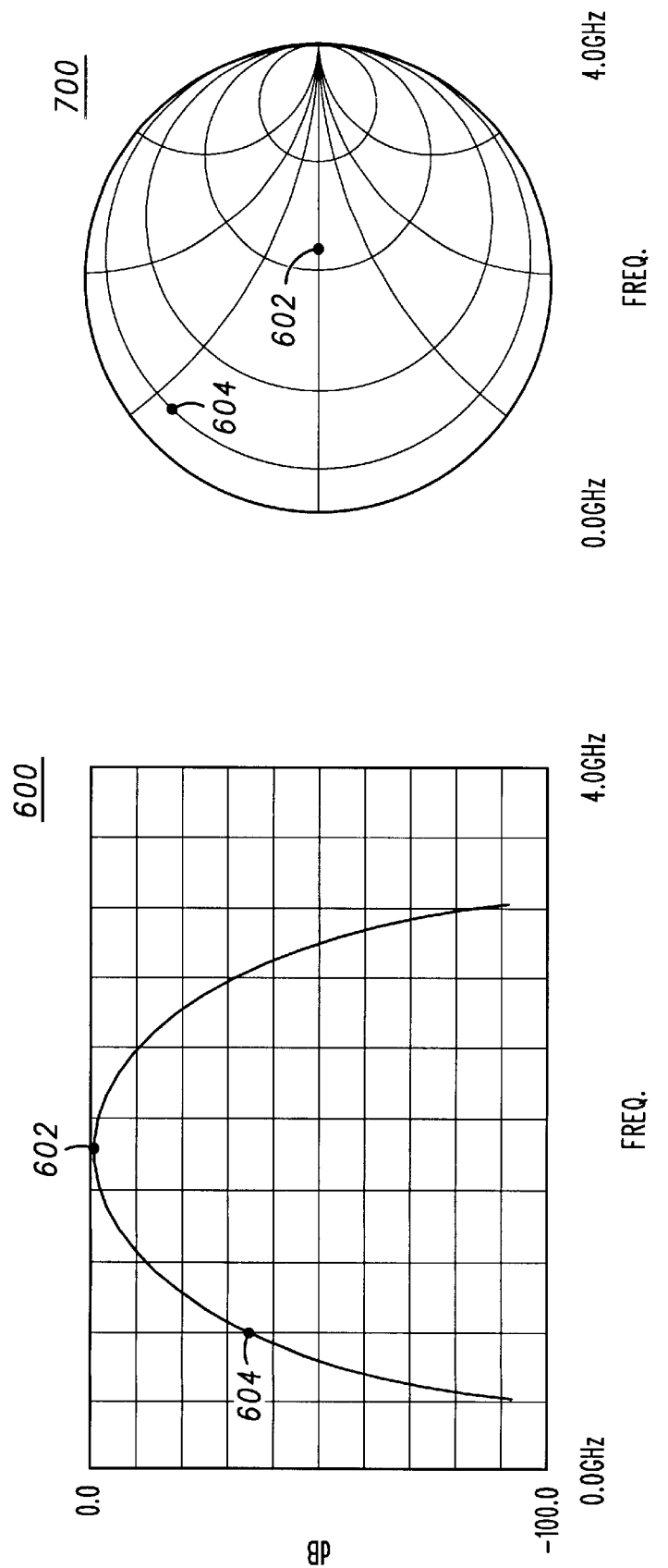
FIG. 6 shows the frequency response of the second path of the preferred embodiment of the present invention.

Turning to FIG. 6, a frequency response chart shows the frequency response of the second path 206. The frequency response is such that the RF communication signals in the second RF band pass through to the antenna. FIG. 6 also shows that the RF communication signal in the first RF band are attenuated significantly. FIG. 7 is a smith chart 500 showing the second RF band impedance 602 of the second RF band or in-band RF communication signal, and the first RF band impedance 604, of the first RF band or out-of-band communication signal.

In the preferred embodiment of the present invention the second filter 232 is a capacitor 234 coupled in parallel with an inductor 236 coupled in series between the first node 210 and the sixth node 238. The capacitor 234 coupled in parallel with inductor 236 is commonly referred to as an LC tank. The second filter 232 is parallel resonant at the first RF band and allows frequencies in the second RF band to pass through. In the case of the preferred embodiment of the present invention, the second filter 232 is parallel resonant at 800 MHz acting as an open circuit. At the second RF band, or high band, the second filter 232 is above resonance and in the ideal component case would appear to be capacitive. However by forming the second filter 232 with the series resonant fifth capacitor 234, the second filter 232 actually appears as a through circuit at the second RF band, or the high band. Because the impedance of the RF communication signal in the second RF band is already transformed to the characteristic impedance at the first node, 50 ohms for example, the nominal Q values achieved with conventional components to form the fifth capacitor 234 and the parallel inductor 236, cause very little dissipative loss. Using conventional components as opposed to high Q components and using only two components for the filter keeps the cost of the components low allowing the circuit to be economically feasible.

When the device is in the first operation mode and operating in the first RF band, the real portion of the impedance seen by the complex transformer 202, looking into the second path 206, or high band path, will be much higher than the impedance looking into the first path 204. Because of this large impedance differential, only a small portion of the energy will be dissipated or lost in the second path 206. This is accomplished by designing the complex transformer 202 so that the impedance of the RF communication signal is only partially transformed in the first RF band, or low band in the case of the preferred embodiment. Also in the preferred embodiment of the present invention, the impedance of the second path 206 is approximately 500 Ohms and the impedance of the first path 204 is 5 Ohms, resulting in an insertion loss of only three tenths of a dB, which is well within the insertion loss budget.

Because the complex transformer 202 only partially transforms the impedance in the first RF band, the impedance transformation must be completed prior to further filtering and transmission. The second transmission line 216, third transmission line 222, second capacitor 220, and third capacitor 226 of the first path are therefore designed to complete the impedance transformation from the second impedance at the first node 210, to a fourth impedance at the fourth node 224. The third capacitor 226, has a value such that it is series resonant when the RF communication signal is in the second RF band, or high band. This eliminates the need to control or specify the out of band impedance of the first filter 228. Any variations in load occurring after the third capacitor 226 are masked by the near zero impedance presented thereby at the second RF band.

Although the invention has been described and illustrated in the above description and drawings, it is understood that this description is by way of example only and that numerous changes and modifications can me made by those skilled in the art without departing from the true spirit and scope of the invention. For example, although the present method and apparatus is for transmitting RF communication signals, it may also apply to other forms of wireless communication signal such as light waves. Although the present invention finds particular use in portable cellular radiotelephones, the invention could be applied to any wireless communication device, including pagers, electronic organizers, and computers. Applicant's invention should be limited only by the following claims.

What is claimed is:

1. A transmitter for transmitting a radio frequency (RF) communication signal in a first RF band and in a second RF band comprising:

A power amplifier (PA), having a PA output, said PA for amplifying said RF communication signal, in said first RF band and in said second RF band;

a first transformer comprising a first node, a second node, a first transmission line coupled between said PA output and said first node, and a first parallel capacitor coupled between said first node and said second node, said first transformer for fully transforming the impedance of said RF communication signal in said second RF band to a first fully transformed impedance at said first node, and said first transformer for partially transforming the impedance of said second RF communication signal in said first RF band to a second partially transformed impedance at said first node;

a first path having a third node, a fourth node and a fifth node, a second transmission line coupled between said first node and said third node, a second parallel capacitor coupled between said third node and said second node, a third transmission line coupled between said third node and said fourth node, a third parallel capacitor coupled between said fourth node and said second node, and a first filter coupled between said fourth node and said fifth node for passing only said communication signal in said first RF band; and a second path having a sixth node, a seventh node, a third filter coupled between said first node and said sixth node, a fourth transmission line coupled between said sixth node and said seventh node, a fourth parallel capacitor coupled between said seventh node and said second node and a second filter coupled between said seventh node and said fifth node, for passing only said second RF communication in said second RF band.

2. The transmitter as in claim 1, wherein said first filter is a low pass filter, wherein said second filter is a low pass filter, and wherein said third filter is an LC tank filter.

3. The transmitter as in claim 1, wherein said first transmission line has a first impedance, said second transmission line has a second impedance, said third transmission line has a third impedance, and said fourth transmission line has a fourth impedance.

4. The transmitter as in claim 1, wherein said first RF band is in accordance with the Advanced Mobile Phone System (AMPS) and the time division multiple access (TDMA) 800 MHz system, and said second RF band is in accordance with said TDMA 1900 MHz system.

5. The transmitter as in claim 2, wherein said LC tank filter further comprises a fifth parallel capacitor and an inductor in parallel coupled in series between said first node and said sixth node, wherein said fifth parallel capacitor is series resonant when said RF communication signal is in said second RF band, wherein said LC tank filter forms an open circuit when said RF communication signal is in said first RF band, and wherein said LC tank filter has an effective parallel resistance at least ten times greater than second first partially transformed impedance when said communication signal is in said first RF band.

6. The transmitter as in claim 1, wherein said second node is a common ground.

7. The transmitter as in claim 1, wherein said first path transforms said second impedance to said third impedance between said first node and said fourth node.

8. The transmitter as in claim 1, wherein said third parallel capacitor is series resonant when said RF communication signal is in said second RF band.

9. A method for transmitting radio frequency (RF) communication signals in a first RF band and a second RF band comprising the steps of:

amplifying said RF communication signal with a power amplifier;

transforming the impedance of said RF communication signal partially to a first partially transformed impedance when said RF communication signal is in a first RF band;

transmitting said first transformed RF communication signal having a frequency within said first RF band through a first transmission path;

transforming the impedance of said RF communication signal completely to a second fully transformed impedance when said RF communication signal is in said second band; and transmitting said second transformed RF communication signal having a frequency within said second band through a second transmission path.

10. The method of claim 9 further comprising the step of amplifying said RF communication signal in said first and said second RF band with only one said PA.

11. The method of claim 9 further comprising the step of completing the impedance transformation of said first partially transformed impedance of said RF communication signal to said second impedance with said first transmission path.

12. The method of claim 9 further comprising the step of passing said RF communication signal through said second transmission path when said RF communication signal is in said second RF band with an LC tank filter, and creating a parallel resonant circuit with said LC tank filter when said RF communication filter is in said first RF band preventing said RF communication signal from passing through said second transmission path.

13. The method of claim 9 further comprising the step of generating an effective parallel resistance with said LC tank filter such that said parallel resistance is at least ten times greater than said first partially transformed impedance when said communication signal is in said first RF band.

* * * * *